(12) United States Patent
Yoshikawa

(10) Patent No.: US 11,639,073 B2
(45) Date of Patent: May 2, 2023

(54) RECORDING METHOD AND RECORDING DEVICE

(71) Applicant: SEIKO EPSON CORPORATION, Tokyo (JP)

(72) Inventor: Eishin Yoshikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 260 days.

(21) Appl. No.: 16/952,133

(22) Filed: Nov. 19, 2020

(65) Prior Publication Data

US 2021/0155025 A1 May 27, 2021

(30) Foreign Application Priority Data

Nov. 21, 2019 (JP) .............................. JP2019-210251

(51) Int. Cl.
*B41M 5/00* (2006.01)
*B41J 11/00* (2006.01)
(Continued)

(52) U.S. Cl.
CPC ........ *B41M 5/0023* (2013.01); *B41J 11/0015* (2013.01); *B41J 11/00216* (2021.01);
(Continued)

(58) Field of Classification Search
CPC ..... C09D 11/38; C09D 11/101; C09D 11/322; C09D 11/52; C09D 11/324; C09D 11/328; C09D 11/36; C09D 11/40; C09D 11/30; C09D 11/32; C09D 11/102; C09D 11/005; C09D 11/54; C09D 11/106; C09D 7/40; C09D 7/65; C09D 129/04; B41M 7/0045; B41M 7/0081; B41M 5/0011; B41M 5/0017; B41M 5/0023; B41M 5/0047; B41M 7/00; B41M 7/0072; B41M 5/52; B41M 5/5218; B41M 5/5227; B41M 5/0256; B41M 5/03; B41J 29/02;
(Continued)

(56) References Cited

U.S. PATENT DOCUMENTS

2004/0061760 A1 * 4/2004 Yano ...................... B41J 2/2114
347/102
2006/0125895 A1 * 6/2006 Nito ...................... C09D 11/54
347/100
(Continued)

FOREIGN PATENT DOCUMENTS

JP 2018-138354 A 9/2018

*Primary Examiner* — Manish S Shah
(74) *Attorney, Agent, or Firm* — Global IP Counselors, LLP

(57) ABSTRACT

A recording method is for performing recording by ejecting, onto a recording medium, ink and a reaction solution including a flocculating agent that flocculates a substance contained in the ink, and the recording method includes ejecting the reaction solution as a droplet onto the recording medium, and ejecting the ink as a droplet onto the recording medium. A relationship of $Op1 \geq Op2$ is satisfied when an ejection amount of the reaction solution during ejecting the reaction solution in a first recording mode is indicated with $Op1$, and an ejection amount of the reaction solution during ejecting the reaction solution in a second recording mode is indicated with $Op2$, the second recording mode having a recording speed lower than the first recording mode.

5 Claims, 6 Drawing Sheets

(51) Int. Cl.
*C09D 11/50* (2014.01)
*C09D 11/54* (2014.01)
*C09D 11/30* (2014.01)
*B41M 7/00* (2006.01)

(52) U.S. Cl.
CPC ........ *B41M 5/0017* (2013.01); *B41M 7/0018* (2013.01); *C09D 11/30* (2013.01); *C09D 11/50* (2013.01); *C09D 11/54* (2013.01)

(58) Field of Classification Search
CPC .... B41J 2/17513; B41J 2/17509; B41J 29/13; B41J 2/17553; B41J 2/1606; B41J 2/1642; B41J 2/1609; B41J 2/1433; B41J 2/164; B41J 2/162; B41J 2/161; B41J 2/19; B41J 15/04; B41J 2/04588; B41J 2/04595; B41J 2/04586; B41J 2/14274; B41J 2/01; B41J 2/211; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 29/17; B41N 10/00
See application file for complete search history.

(56) References Cited

U.S. PATENT DOCUMENTS

| | | | |
|---|---|---|---|
| 2009/0315937 A1* | 12/2009 | Kubota | B41J 2/2121 347/15 |
| 2010/0156973 A1* | 6/2010 | Suzuki | B41J 2/2114 347/10 |
| 2010/0328389 A1* | 12/2010 | Kunimine | B41J 2/2114 347/14 |
| 2018/0244078 A1 | 8/2018 | Okuda et al. | |
| 2018/0361755 A1* | 12/2018 | Yoshikawa | B41J 2/2114 |

* cited by examiner

RECORDING METHOD AND RECORDING DEVICE

The present application is based on, and claims priority from JP Application Serial Number 2019-210251, filed Nov. 21, 2019, the disclosure of which is hereby incorporated by reference herein in its entirety.

BACKGROUND

1. Technical Field

The present disclosure relates to a recording method and a recording device of an ink jet-type in which ink is ejected onto a recording medium for recording.

2. Related Art

Ink jet-type recording can be performed on recording media formed of various types of materials. For example, in order to secure a fixing property of ink and accurate recording quality, recording is performed on various types of recording media through use of a reaction solution in addition to ink in some cases. JP-A-2018-138354 describes a recording method including a reaction solution adhesion process and a colored ink adhesion process. In the reaction solution adhesion process, a reaction solution including a flocculating agent that flocculates a colored ink composition is ejected as a droplet, and the reaction solution is caused to adhere onto a recording medium. In the colored ink adhesion process, a colored ink composition is ejected as a droplet, and is caused to adhere onto a recording region of the recording medium onto which the reaction solution adheres.

However, in the recording method described in JP-A-2018-138354, when the reaction solution is applied on the recording medium by an amount more than necessary, there is a problem in that recording quality is degraded in some cases. For example, wear resistance is disadvantageously degraded, or image quality is degraded.

SUMMARY

A recording method is for performing recording by ejecting, onto a recording medium, ink and a reaction solution including a flocculating agent that flocculates a substance contained in the ink, and the recording method includes ejecting the reaction solution as a droplet onto the recording medium, and ejecting the ink as a droplet onto the recording medium. A relationship of $Op1 \geq Op2$ is satisfied when an ejection amount of the reaction solution during ejecting the reaction solution in a first recording mode is indicated with $Op1$, and an ejection amount of the reaction solution during ejecting the reaction solution in a second recording mode is indicated with $Op2$, the second recording mode having a recording speed lower than the first recording mode.

A recording method is for performing recording by ejecting, onto a recording medium, ink and a reaction solution including a flocculating agent that flocculates a substance contained in the ink, and the recording method includes ejecting the reaction solution as a droplet onto the recording medium, and ejecting the ink as a droplet onto the recording medium. An ejection amount $Op$ is determined based on $Vt$, $T$, $At$, and $Ah$ when an ejection amount of the reaction solution during ejecting the reaction solution is indicated with $Op$, an ejection amount of the ink during ejecting the ink is indicated with $Vt$, a time period required for recording in a predetermined area of the recording medium is indicated with $T$, temperature in an environment for performing recording is indicated with $At$, and relative humidity in the environment is indicated with $Ah$.

A recording device is configured to perform recording by ejecting, onto a recording medium, ink and a reaction solution including a flocculating agent that flocculates a substance contained in the ink, and the recording device includes a nozzle configured to eject the ink, a nozzle configured to eject the reaction solution, and a control unit configured to control an ejection amount of the reaction solution. The control unit performs control and satisfies a relationship of $Op1 \geq Op2$ when an ejection amount of the reaction solution in a first recording mode is indicated with $Op1$, and an ejection amount of the reaction solution in a second recording mode is indicated with $Op2$, the second recording mode having a recording speed lower than the first recording mode.

DESCRIPTION OF EXEMPLARY EMBODIMENTS

Figure 1:
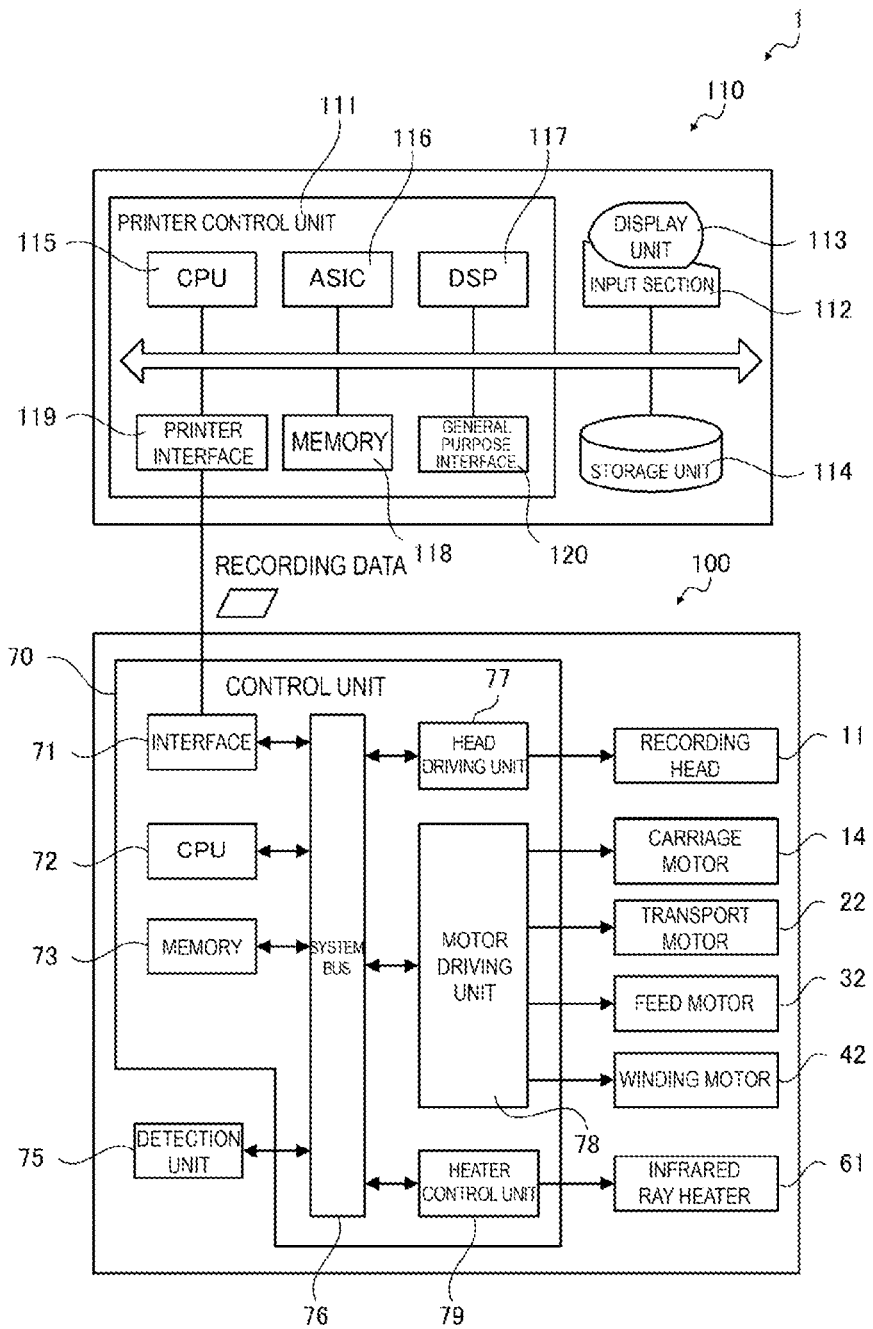
FIG. 1 is a block diagram illustrating a configuration of a recording device according to an exemplary embodiment.

A schematic configuration of a recording device 1 according to an exemplary embodiment is described with reference to FIG. 1 and FIG. 2.

Note that, in coordinates denoted in the drawings, a Z-axis direction corresponds to an up-down direction, a +Z direction corresponds to an up direction, a Y-axis direction corresponds to a front-rear direction, a +Y direction corresponds to a front direction, an X-axis direction corresponds to a right-left direction, a +X direction corresponds to a left direction, and an X-Y plane corresponds to a horizontal plane.

The recording device 1 includes a printer 100, and an image processor 110 connected to the printer 100.

The printer 100 is an inkjet printer capable of performing recording by ejecting water-based ink and a reaction solution onto a recording medium 5, which is fed in a state of being wound into a roll, based on recording data received from an image processor 110.

The ink is constituted of an ink set of six colors including cyan, magenta, yellow, black, light cyan, and light magenta, but is not limited thereto.

The reaction solution includes a flocculating agent that flocculates a substance contained in the ink.

The image processor 110 includes a printer control unit 111 as a control unit in the present application, an input unit 112, a display unit 113, a storage unit 114, and the like, and controls recording jobs for causing the printer 100 to perform recording. Further, the image processor 110 generates recording data for causing the printer 100 to record a desired image based on image data. In a preferred example, the image processor 110 is constituted of a personal computer.

Software run by the image processor 110 includes a general image processing application for handling image data to be recorded, and a printer driver for controlling the printer 100 and for generating recording data to cause the printer 100 to perform recording.

For example, the image data is data such as RGB data obtained by a general purpose image acquisition device such as a digital camera.

The recording data is image formation data obtained by converting the image data so that the printer 100 can record the recording data using the printer driver included in the image processor 110, and includes a command for controlling the printer 100.

The printer control unit 111 includes a CPU 115, an ASIC 116, a DSP 117, a memory 118, a printer interface 119, a general purpose interface 120, and the like, and performs centralized control for the entire recording device 1.

The CPU is an abbreviation for Central Processing Unit, the ASIC is an abbreviation for Application Specific Integrated Circuit, and the DSP is an abbreviation for Digital Signal Processor. The input unit 112 is an information input means. Specifically, the input unit 112 is, for example, a port or the like for connecting a keyboard, a mouse pointer, or an information input device, and is capable of inputting input device information for controlling the printer control unit 111.

The display unit 113 is an information display means, and displays information input from the input unit 112, an image to be recorded by the printer 100, information about a recording job, and the like, based on the control of the printer control unit 111. Further, the input unit 112 and the display unit 113 may be integrated to achieve a touch panel.

The storage unit 114 is a rewritable storage medium such as a hard disk drive or a memory card, and stores programs run by the printer control unit 111, an image to be recorded, information about a recording job, and the like.

The memory 118 is a storage medium that secures a region for storing programs run by the CPU 115, a work region in which such programs run, and the like, and includes storage elements such as a RAM and an EEPROM. The RAM is an abbreviation for Random access memory, and the EEPROM is an abbreviation for Electrically Erasable Programmable Read-Only Memory.

For example, the general purpose interface 120 is an interface capable of connecting external electronic devices, such as a LAN interface and a USB interface.

The LAN is an abbreviation for Local Area Network, and the USB is an abbreviation for Universal Serial Bus.

Figure 2:
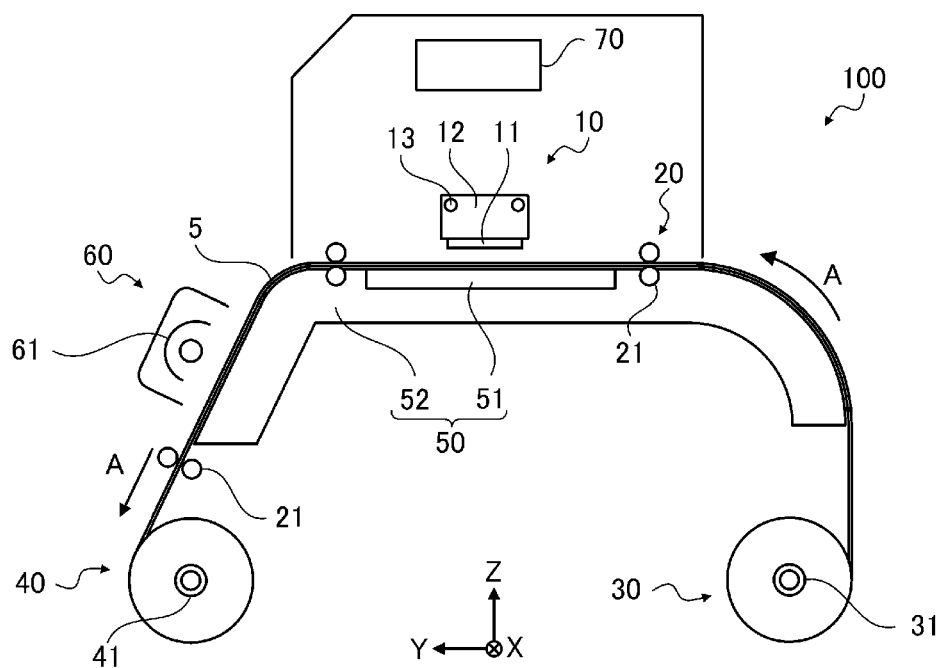
FIG. 2 is a side view schematically illustrating a printer included in the recording device.

As illustrated in FIG. 2, the printer 100 includes a recording unit 10, a transport unit 20, a feeding unit 30, a winding unit 40, a transport path 50, a drying unit 60, a recording control unit 70, and the like.

The recording medium 5 is fed from the feeding unit 30, and is transported in the transport path 50 by the transport unit 20. With this, the recording medium 5 is stored by the winding unit 40 via the recording unit 10 and the drying unit 60.

The recording unit 10 is constituted of a recording head 11, a carriage 12, a guide shaft 13, and the like. The recording head 11 is an ink jet head including a plurality of nozzles configured to eject the ink as ink droplets and a plurality of nozzles configured to eject the reaction solution as droplets. The guide shaft 13 extends in a scanning direction intersecting with a transport direction A in which the recording medium 5 moves. In a recording region in which the recording head 11 performs recording on the recording medium 5, the transport direction A corresponds to the Y-axis direction in FIG. 2 and the scanning direction corresponds to the X-axis direction. The recording head 11 is mounted on the carriage 12, and a carriage motor 14 driven and controlled by the recording control unit 70 causes the carriage 12 to reciprocate along the guide shaft 13.

The recording control unit 70 records a desired image on the recording medium 5 by performing control that combines an operation of causing the recording head 11 to eject the ink and the reaction solution while moving the carriage 12 in the scanning direction and a transport operation of causing the transport unit 20 to move the recording medium 5 in the transport direction A. That is, a recording method according to the present exemplary embodiment includes ejecting the ink as a droplet onto the recording medium 5 and ejecting the reaction solution as a droplet onto the recording medium.

The transport unit 20 is a transport mechanism that moves the recording medium 5 in the transport direction A in the transport path 50, and is constituted of a plurality of drive rollers 21 provided nip rollers and the like. When the drive rollers 21 are driven under a state in which the recording medium 5 is sandwiched between the drive rollers 21 and the nip rollers, the recording medium 5 is transported. The drive rollers 21 are driven by a transport motor 22 driven and controlled by the recording control unit 70.

The feeding unit 30 is a housing unit that houses the recording medium 5 before recording is performed, is positioned upstream of the recording unit 10 in the transport path 50, and includes a feeding shaft 31 and the like.

The feeding shaft 31 is rotated by a feeding motor 32 driven and controlled by the recording control unit 70, and feeds out the set recording medium 5 toward the recording unit 10 arranged downstream of the feeding unit 30.

The winding unit 40 is a housing unit that winds the recording medium 5 after recording is completed and houses the recording medium 5 in a state of being wound into a roll, is positioned downstream of the recording unit 10 in the transport path 50, and includes a winding shaft 41 and the like.

The winding shaft 41 winds the recording medium 5, which is rotated by a winding motor 42 driven and controlled by the recording control unit 70 and is fed via the recording unit 10.

Note that, in FIG. 2, the carriage motor 14, the transport motor 22, the feeding motor 32, and the winding motor 42 are omitted in illustration.

The transport path 50 is constituted of a medium support unit 52 including a platen 51 configured to support the recording medium 5 in the recording region of the recording unit 10, and forms a transport path in which the recording medium 5 is transported from the feeding unit 30 to the winding unit 40 via the recording unit 10.

The drying unit 60 includes an infrared ray heater 61, and dries the recording medium 5 after recording is completed. The drying unit 60 is positioned downstream of the recording unit 10 and upstream of the winding unit 40 in the transport path 50, and is provided to face the transported recording medium 5. The infrared ray heater 61 is controlled by the recording control unit 70.

As illustrated in FIG. 1, the recording control unit 70 includes an interface 71, a CPU 72, a memory 73, a detection unit 75, a system bus 76, a head driving unit 77, and a motor driving unit 78, and a heater control unit 79, and the like, and performs overall control of the printer 100.

The interface 71 transmits and receives data between the image processor 110 and the printer 100.

The CPU 72 is an arithmetic processing device configured to perform overall control of the printer 100, and is coupled to the interface 71, the memory 73, the detection unit 75, the head driving unit 77, the motor driving unit 78, and the heater control unit 79 via the system bus 76.

The memory 73 is a region for storing a program run by the CPU 72 and recording necessary information required for operating the CPU 72, and is constituted of a storage element such as a RAM, a ROM, or a flash memory.

The CPU 72 controls the head driving unit 77, the motor driving unit 78, and the heater control unit 79 in accordance with a program stored in the memory 73, a recording job received from the image processor 110, and instruction information.

The detection unit 75 is constituted of a plurality of detectors provided at predetermined positions in the printer 100, for example, in the recording unit 10, the transport unit 20, the feeding unit 30, the winding unit 40, the transport path 50, the drying unit 60, and the like, detects an operation state in the printer 100, and outputs the detection result to the recording control unit 70. Specifically, the detection unit 75 includes a linear encoder, a rotary encoder, an optical sensor, a temperature sensor, a humidity sensor, and the like, and monitors a position of the carriage 12 that performs scanning motion along the guide shaft 13, a transportation state in the transport path 50 such as a setting position of the recording medium 5 in the width direction, presence or absence of a jam, and the like, presence or absence and a remaining amount of the recording medium 5, presence or absence and a remaining amount of the ink in the recording unit 10, and temperature and humidity in the transport path constituted of the transport path 50 or the drying unit 60.

The head driving unit 77 follows an instruction of the CPU 72, and drives the recording head 11.

The motor driving unit 78 follows an instruction of the CPU 72, and drives the carriage motor 14, the transport motor 22, the feeding motor 32, and the winding motor 42.

The heater control unit 79 follows an instruction of the CPU 72, and controls the infrared ray heater 61 included in the drying unit 60.

Figure 3:
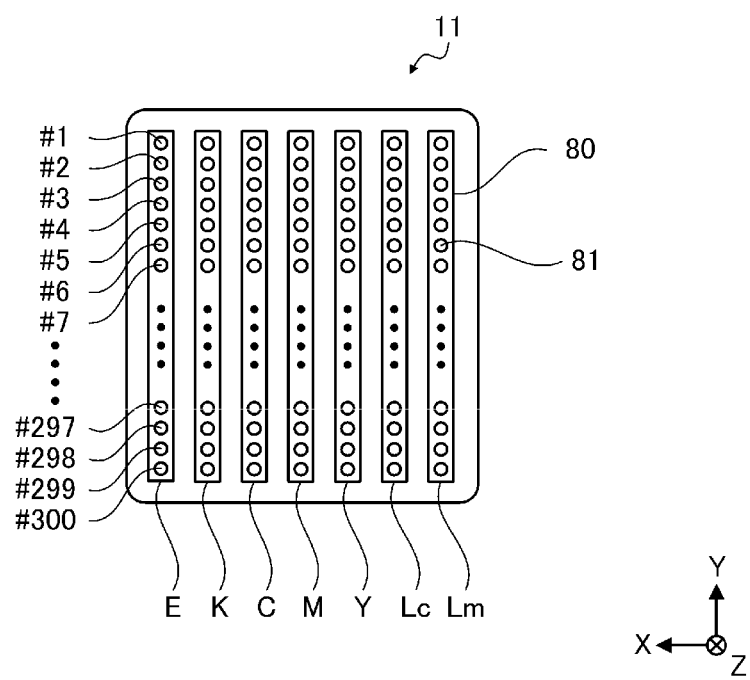
FIG. 3 is a schematic view illustrating an example of arrangement of nozzles when viewed from a lower surface of a recording head.

As illustrated in FIG. 3, the recording head 11 includes seven nozzle rows 80 allocated to eject ink of six colors including black K, cyan C, magenta M, yellow Y, light cyan Lc, and light magenta Lm, and a reaction solution E.

Each of the nozzle rows 80 is constituted of a nozzle row in which 300 nozzles 81 denoted with #1 to #300, respectively, are aligned at a constant interval along the Y-axis direction.

The CPU 72 follows recording data based on image data on a recording target or instruction information such as a recording mode described later, controls selection of the nozzles for ejecting the ink of each color and the reaction solution and an ejecting timing via the head driving unit 77.

Figure 4:
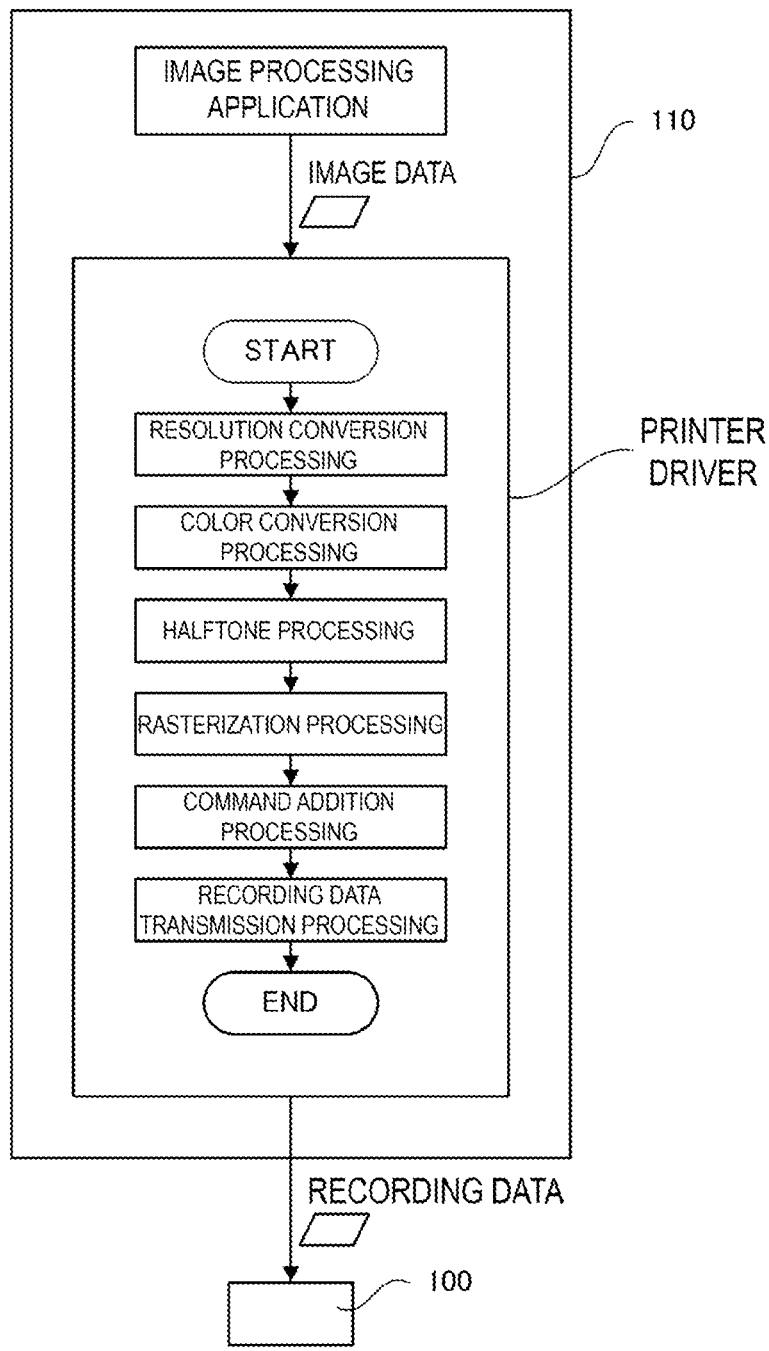
FIG. 4 is an explanatory view of basic functions of a printer driver.

Next, with reference to FIG. 4, basic functions of a printer driver are described.

Recording on the recording medium 5 is started by transmitting the recording data to the printer 100 from the image processor 110. The recording data is generated by the printer driver.

The printer driver receives image data from the image processing application, converts the image data into recording data in a format that can be interpreted by the printer 100, and then outputs the recording data to the printer 100. When the image data from the image processing application is converted into the recording data, the printer driver performs resolution conversion processing, color conversion processing, halftone processing, rasterization processing, command addition processing, and the like.

The resolution conversion processing is processing for converting the image data output from the image processing application into a resolution for recording on the recording medium 5. For example, when the recording resolution is specified as 720×720 dpi, vector format image data received from the image processing application is converted into bit map format image data having a 720×720 dpi resolution. Each pixel data of the image data after the resolution conversion processing includes pixels arranged in a matrix pattern. Each pixel has a gray scale value in, for example, 256 gray scales in the RGB color space. That is, each piece of the pixel data after the resolution conversion indicates the gray scale value of the corresponding pixel.

Among the pixels arranged in the matrix pattern, the pixel data corresponding to one row of pixels aligned in a predetermined direction is called raster data. Note that the predetermined direction in which the pixels corresponding to the raster data are aligned corresponds to the direction in which the recording head 11 moves when recording an image, specifically, the X-axis direction.

The color conversion processing is processing of converting RGB data into data of a CMYK color system space. The CMYK colors refer to cyan C, magenta M, yellow Y, and black K. The image data of the CMYK color system space is data corresponding to the colors of the ink of the printer 100. Therefore, when the printer 100 uses six types of ink of the CMYK color system, the printer driver generates image data in a six-dimensional space of the CMYK color system, based on the RGB data, for example.

This color conversion processing is performed based on a color conversion look-up table in which the gray scale values of the RGB data and the gray scale values of the CMYK color system data are associated with each other. Note that the pixel data after the color conversion processing is, for example, the CMYK color system data of 256 gray scales expressed in the CMYK color system space.

The halftone processing is processing of converting the CMYK color system data of a large number of gray scales, for example, 256 gray scales, into data of a number of gray scales that can be formed by the printer 100. Through this halftone processing, the CMYK color system data expressing 256 gray scales is converted into, for example, 1-bit data expressing two gray scales indicating dot and no dot and 2-bit data expressing four gray scales indicating no dot, small dot, medium dot, and large dot. Specifically, based on a dot generation ratio table in which the gray scale values including 0 to 255 and dot generation ratios are associated with each other, a generation ratio of a dot corresponding to a gray scale value is obtained. Regarding a generation ratio of a dot obtained correspondingly to a gray scale value, for example, in a case of four gray scales, a generation ratio for each of no dot, small dot, medium dot, and large dot is obtained. For each of the obtained dot generation ratios, pixel data is generated in such a way that dots are formed in a dispersed manner using a dither method, an error diffusion method, and the like.

The rasterization processing is processing for rearranging the pixel data, for example, the 1-bit or 2-bit data as described above, in the matrix pattern, according to a dot formation order for recording. The rasterization processing includes pass allocation processing of allocating the image data including the pixel data resulting from the halftone processing to each pass in which the recording head 11 ejects ink droplets while moving. Once the pass allocation is completed, actual nozzles that form respective raster lines constituting a recording image are allocated.

The command addition processing is processing for adding command data corresponding to a recording method, to the rasterized data. The command data includes, for example, transporting data related to a transporting specification such as a moving amount in the transport direction A, a speed, and the like of the recording medium 5.

Processing by the printer driver is performed by the ASIC 116 and the DSP 117 under the control of the CPU 115. The generated recording data is transmitted recording data transmission processing to the printer 100 via the printer interface 119.

Next, the recording method according to the present exemplary embodiment is described.

The rerecording method according to the present exemplary embodiment includes ejecting the reaction solution as a droplet onto the recording medium 5, and ejecting the ink as a droplet onto the recording medium 5. A relationship of Op1≥Op2 is satisfied when an ejection amount of the reaction solution during ejecting the reaction solution in a first recording mode is indicated with Op1, and an ejection amount of the reaction solution during ejecting the reaction solution in a second recording mode is indicated with Op2, the second recording mode having a recording speed lower than the first recording mode.

Figure 5:
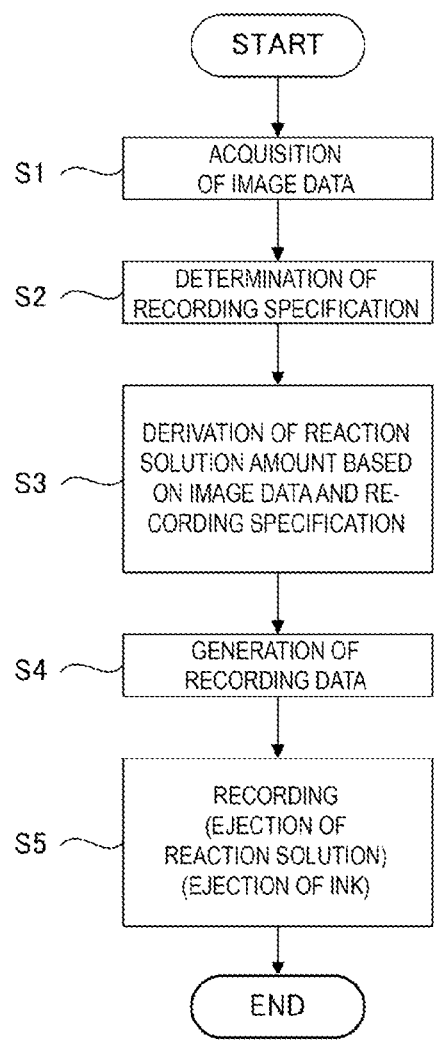
FIG. 5 is a flowchart of a recording method according to an exemplary embodiment.

With reference to the flowchart illustrated in FIG. 5, description is made specifically below.

First, in Step S1, an image data to be recorded is acquired. Specifically, the image processor 110 acquires the image data on the recording target from an external electronic device via the general purpose interface 120. Alternatively, image data on a recording target is selected from one or more pieces of image data acquired in advance and stored in the storage unit 114.

Next, in Step S2, a recording specification is determined. Specifically, the image processor 110 determines a recording specification including a size and a resolution of a recording image, a recording mode, and the like.

The recording modes correspond to, for example, predetermined recording quality degrees including high speed, a standard, high clarity, and the like. As recording quality is higher, the number of paths, which are required for completing recording of an image having a band width that can be recorded during one motion of the recording head 11 in the scanning direction, is increased.

Here, for example, the first recording mode is a recording mode corresponding to the standard, and the second recording mode is a recording mode corresponding to the high clarity. In this case, in the second recording mode, the total number of paths recorded based on the selected image data is larger than the total number of paths in the first recording mode. That is, a recording speed in the second recording mode is lower than that in the first recording mode. The recording speed is a time period required for completing recording, such as recording based on the selected image data and recording of the imaging having the band width described above, in a predetermined area of the recording medium 5, that is, a recording time period for each recording unit.

In Step S3 performed subsequently after Step S2, the image processor 110 derives an amount of the reaction solution to be ejected, based on the image data and the determined recording specification. Specifically, the printer control unit 111 obtains, from the image data, a total ink amount required for recording one corresponding image, that is, a total ejection amount of the ink during ejecting the ink when a recording image is recorded based on the image data, and obtains an ejection amount of the reaction solution corresponding to the ejection amount of the ink. More specifically, when the ejection amount of the ink during ejecting the ink is indicated with Vt, the ejection amount of the reaction solution during ejecting the reaction solution in the first recording mode is indicated with Op1, the ejection amount of the reaction solution during ejecting the reaction solution in the second recording mode is indicated with Op1, and k1 and k2 are used as coefficients, the ejection amount of the reaction solution is calculated based on expressions given below.

$$Op1 = Vt \times k1$$

$$Op2 = Vt \times k2$$

$$k1 \geq k2$$

As a result, Op1≥Op2 is satisfied.

Here, k1 are k2 coefficients that are determined in advance based on sufficient evaluation. Specifically, in some cases, a necessary and sufficient amount of the reaction solution is changed due to the material of the recording medium 5, a time period required for recording in a predetermined area of the recording medium 5, temperature in an environment for performing recording, relative humidity in the environment for performing recording, and the like. Thus, k1 and k2 are preferably determined based on evaluation in consideration of these factors.

In other words, for each type of the recording medium 5, an ejection amount Op is preferably determined based on Vt, T, At, and Ah when the ejection amount of the reaction solution during ejecting the reaction solution is indicated with Op, the ejection amount of the ink during ejecting the ink is indicated with Vt, the time period required for recording in a predetermined are of the recording medium 5 is indicated with T, the temperature of the environment for performing recording is indicated with At, and the relative humidity in the environment for performing recording is indicated with Ah.

As described above, the recording device 1 is a recording device configured to perform recording by ejecting, onto the recording medium 5, the ink and the reaction solution including a flocculating agent that flocculates a substance contained in the ink, and includes the nozzles 81 configured to eject the ink, the nozzles 81 configured to eject the reaction solution, and the printer control unit 111 configured to control the ejection amount of the reaction solution. The printer control unit 111 performs control and satisfies a relationship of Op1≥Op2 when the ejection amount of the reaction solution in the first recording mode is indicated with Op1, and the ejection amount of the reaction solution in the second recording mode is indicated with Op2, the second recording mode having a recording speed lower than the first recording mode.

Moreover, as described above, the ejection amount of the reaction solution is further preferably derived as a necessary amount of the reaction solution correspondingly to the amount of the ink for each unit pixel based on the image data to be recorded, instead of a total ejection amount of the reaction solution during ejecting the reaction solution, which corresponds to the total ink amount required for recording one image based on the image data. Specifically, when the amount of the ink corresponding to the unit pixel calculated based on the image data of the recording target is indicated with Vp, the amount of the reaction solution corresponding to the unit pixel in the first recording mode is indicated with Opp1, the amount of the reaction solution corresponding to the unit pixel in the second recording mode is indicated with Opp2, and k1 and k2 are used as coefficients, the ejection amount of the reaction solution for each unit pixel is calculated based on expressions given below.

$$Opp1 = Vp \times k1$$

$$Opp2 = Vp \times k2$$

$$k1 \geq k2$$

Note that the coefficients k1 and k2 used herein are coefficients for deriving a necessary amount of the reaction solution correspondingly to the ink amount for each unit pixel, and hence, in some cases, values to be obtained in advance based on evaluation are different from the values of the coefficients k1 and k2 described above.

A specific method of obtaining Opp1 and Opp2 is described. Here, the amount of the reaction solution corresponding to the unit pixel is indicated with Opp.

With the functions of the printer driver described above, a gray scale value for each unit pixel in the CMYK color system data is obtained based on the color conversion look-up table through the color conversion processing. The gray scale value for each unit pixel in the CMYK color system data is a value corresponding to the ink amount. When ink amounts for the unit pixels of cyan, magenta, yellow, black, light cyan, and light magenta are indicated with c, m, y, k, lc, and lm, respectively, the amount Opp of the reaction solution corresponding to the unit pixel is obtained based on an expression given below.

$$Opp = \Sigma(c,m,y,k,lc,lm) \times k0$$

Here, $\Sigma(c, m, y, k, lc, lm)$ is the total amount of c, m, y, k, lc, and lm. Further, the coefficient k0 corresponds to any one of k1 and k2 in accordance with the recording mode.

Alternatively, as in the expression given above, instead of calculating Opp from the total amount of the ink for each unit pixel, which is $\Sigma(c, m, y, k, lc, lm)$ obtained as a result of the color conversion processing, Opp may be directly obtained through the color conversion processing. Specifically, in the color conversion look-up table, coordinates of Opp corresponding to coordinates (c, m, y, k, lc, lm) are included in advance in coordinates in the CMYK color system space corresponding to the RGB color space, that is, coordinates of the reaction solution are included in the CMYK color system space. With this, through the color conversion processing in which the RGB data is converted into the data in the CMYK color system space, Opp corresponding to each unit pixel can be directly obtained. Note that the coordinates Opp corresponding to the coordinates (c, m, y, k, lc, lm) are required to be obtained in advance as a result of evaluation.

Next, in Step S4, the recording data is generated. Specifically, as described above, based on c, m, y, k, lc, lm, and Opp obtained for each unit pixel, the processing after the halftone processing is performed with the functions of the printer driver, and the recording data is generated. The description of the basic functions of the printer driver as given above does not include the reaction solution. However, the reaction solution is subjected to the processing by regarding the reaction solution as another type of ink. That is, the processing after the halftone processing is performed as processing targeting seven types of liquid including the ink of six colors and the reaction solution.

Next, in Step S5, recording is performed. Specifically, the generated recording data is transmitted from the image processor 110 to the printer 100. the printer 100 that received the recording data performs recording including ejecting the reaction solution and ejecting the ink, based on the recording data.

Incidentally, as described above, a necessary and sufficient amount of the reaction solution differs in accordance with the material of the recording medium 5 in some cases. However, it is difficult to perform evaluation for obtaining a necessary and sufficient amount of the reaction solution for all the types of the recording medium 5 in advance. That is, the recording medium 5 used by a user is not included the recording medium 5 that is assumed and evaluated in advance in some cases. In such case, a user preferably sets a necessary and sufficient amount of the reaction solution.

Specifically, once a user executes recording that uses an amount the reaction solution corresponding to any types of the recording medium 5, which are evaluated in advance, the user can evaluate the recording result and can input a modification instruction in accordance with the evaluation result via the input unit 112. The printer control unit 111 is configured to re-calculate the values of Op1 and Op1, based on the modification instruction that is input. The modification instruction that is input by the user is, for example, an instruction of specifying a degree of modifying the values of the coefficients k1 and k2 described above.

Further, as illustrated in FIG. 3, on the recording head 11, the nozzle rows 80 that eject the ink and the nozzle rows 80 that eject the reaction solution are aligned in the scanning direction. Thus, the ink and the reaction solution can be ejected simultaneously while the recording head 11 moves. However, in a case where recording with higher quality is performed, the reaction solution is applied precedently to the recording medium 5, and then the ink is ejected onto the region to which the reaction solution is applied, which is effective because a predetermined reaction can be performed more smoothly.

Figure 6:
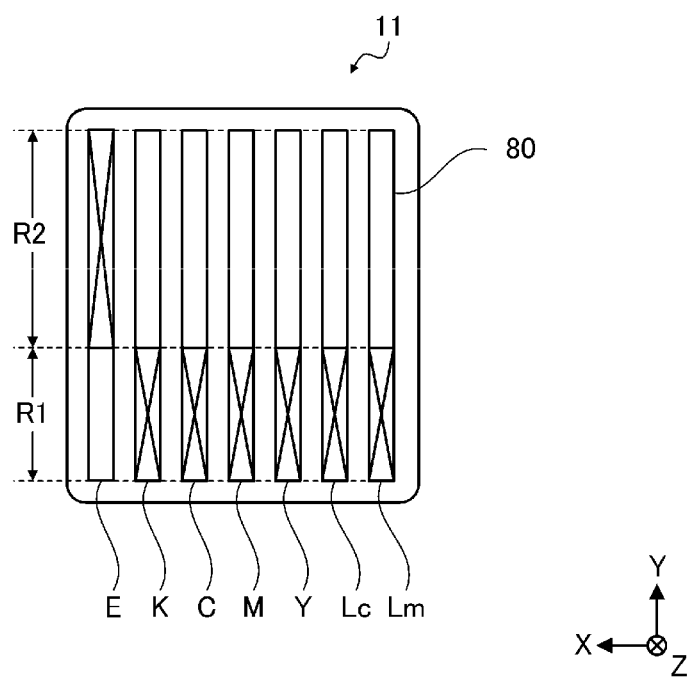
FIG. 6 is a schematic view of the recording head, which illustrates arrangement of reaction solution ejection nozzles and ink ejection nozzles.

Thus, in accordance with a recording mode, in other words, in a case where recording with higher quality is performed, the reaction solution is preferably configured to be ejected precedently. Specifically, as illustrated in FIG. 6, on the recording head 11, the nozzles that eject the reaction solution E are arranged in a region R1 upstream in the transport direction A of the recording medium 5, and the nozzles that eject the ink are arranged in a region R2 downstream in the transport direction A. For example, in the nozzle row 80 that ejects the reaction solution E, among the nozzles 81 denoted with #1 to #300 illustrated in FIG. 3, the nozzles 81 denoted with #201 to #300 are set to be available, and the nozzles 81 denoted with #1 to #200 are set to be non-use. Further, in the nozzle row 80 that ejects the ink of each of the colors including cyan C, magenta M, yellow Y, black K, light cyan Lc, and light magenta Lm, the nozzles 81 denoted with #1 to #200 are set to be available, and the nozzles 81 denoted with #201 to #300 are set to be non-use.

This setting of available or non-use as well as the setting of sizes of ranges of the region R1 and the region R2 can be performed correspondingly to the determined recording mode through the rasterization processing performed with the functions of the printer driver.

According to the present exemplary embodiments, the following effects can be obtained.

In the second recording mode having a recording speed lower than the first recording mode, flocculation of a substance contained in the ink is promoted during recording, and a degree at which flocculation assisted by the reaction solution is required is low in some cases. The ejection amount Op2 of the reaction solution in the second recording mode having a recording speed lower than the first recording mode is equivalent to or smaller than the ejection amount Op1 of the reaction solution in the first recording mode. Thus, the reaction solution is prevented from being applied on the recording medium 5 by an amount more than necessary. As a result, degradation of recording quality such as degradation of wear resistance and degradation of image quality, which is caused by applying the reaction solution on the recording medium 5 by an amount more than necessary, can be suppressed.

When the ejection amount of the ink during ejecting the ink is indicated with Vt, and k1 and k2 are used as coefficients, the ejection amount Op1 of the reaction solution in the first recording mode and the ejection amount Op2 of the reaction solution in the second recording mode having a recording speed lower than the first recording mode are obtained from expressions given below. In this case, each of the ejection amount Op1 of the reaction solution in the first recording mode during ejecting the reaction solution and the ejection amount Op2 of the reaction solution in the second recording mode during ejecting the reaction solution is proportional to the amount Vt of the ink ejected during ejecting the ink. Thus, the reaction solution is prevented from being applied on the recording medium 5 by an amount more than necessary. As a result, degradation of recording quality, which is caused by applying the reaction solution on the recording medium 5 by an amount more than necessary, can be suppressed.

$Op1 = Vt \times k1$ $Op2 = Vt \times k2$ $k1 \geq k2$

When the amount of the ink corresponding to the unit pixel calculated based on the image data of the recording target is indicated with Vp, the amount of the reaction solution corresponding to the unit pixel in the first recording mode is indicated with Opp1, the amount of the reaction solution corresponding to the unit pixel in the second recording mode is indicated with Opp2, and k1 and k2 are used as coefficients, Opp1 and Opp2 are obtained from expressions given below. In this case, the required amounts Opp1 and Opp2 of the reaction solution are determined correspondingly to the amount Vp of the ink for each unit pixel based on the image data to be recorded. Thus, the reaction solution is prevented from being applied on the recording medium 5 by an amount more than necessary. As a result, degradation of recording quality, which is caused by applying the reaction solution on the recording medium 5 by an amount more than necessary, can be suppressed.

$Opp1 = Vp \times k1$ $Opp2 = Vp \times k2$ $k1 \geq k2$

When the ejection amount Op of the reaction solution during ejecting the reaction solution is obtained based on the ejection amount Vt of the ink, the time period T required for recording, the temperature At of the environment for performing recording, and the relative humidity Ah in the environment for performing recording, the ejection amount of the reaction solution, which is required for recording, can be obtained as a more suitable amount. As a result, degradation of recording quality, which is caused by applying the reaction solution on the recording medium 5 by an amount more than necessary.

The printer control unit 111 as a control unit included in the recording device 1 performs control in such a way that the ejection amount Op2 of the reaction solution in the second recording mode having a recording speed lower than the first recording mode is equivalent to or smaller than the ejection amount Opt of the reaction solution in the first recording mode. Thus, the reaction solution is prevented from being applied on the recording medium 5 by an amount more than necessary. As a result, degradation of recording quality, which is caused by applying the reaction solution on the recording medium 5 by an amount more than necessary, can be suppressed.

The recording device 1 includes the input unit 112 capable of inputting a modification instruction for the ejection amount of the reaction solution. With this, for example, in accordance with a new specification of the recording medium 5, the amount of the reaction solution can be modified to a more suitable ejection amount to perform recording, and hence user friendliness can be improved.

What is claimed is:

1. A recording method for performing recording by ejecting, onto a recording medium, ink and a reaction solution including a flocculating agent that flocculates a substance contained in the ink, the recording method comprising:
    ejecting the reaction solution as a droplet onto the recording medium so as to satisfy Op1≥Op2, an ejection amount of the reaction solution in the ejecting of the reaction solution in a first recording mode being Op1, and an ejection amount of the reaction solution in the ejecting of the reaction solution in a second recording mode being Op2, a recording speed in the second recording mode being lower than in the first recording mode;
    ejecting the ink as a droplet onto the recording medium;
    accepting, from a user, at an input unit, a change instruction of specifying a degree of modifying values of coefficients for calculation of the Op1 and the Op2; and
    re-calculating a value of the Op1 and a value of the Op2, based on the change instruction that has been accepted from the user at the input unit.

2. The recording method according to claim 1, wherein Op1=Vt×k1, Op2=Vt×k2, and k1≥k2, wherein an ejection amount of the ink in the ejection of the ink is Vt, and k1 and k2 are the coefficients.

3. The recording method according to claim 1, wherein Opp1=Vp×k1, Opp2=Vp×k2, and k1≥k2, wherein an amount of the ink corresponding to a unit pixel calculated based on image data of a recording target is Vp, an amount of the reaction solution in the first recording mode corresponding to the unit pixel is Opp1, an amount of the reaction solution in the second recording mode corresponding to the unit pixel is Opp2, and k1 and k2 are the coefficients.

4. A recording method for performing recording by ejecting, onto a recording medium, ink and a reaction solution including a flocculating agent that flocculates a substance contained in the ink, the recording method comprising:
    ejecting the reaction solution as a droplet onto the recording medium, an ejection amount Op being determined based on Vt, T, At, and Ah, an ejection amount of the reaction solution in the ejecting of the reaction solution is being Op, an ejection amount of the ink in ejecting of the ink being Vt, a time period required for performing recording for a predetermined area of the recording medium being T, a temperature in an environment for performing recording being At, and a relative humidity in the environment being Ah;

ejecting the ink as a droplet onto the recording medium;

accepting, from a user, at an input unit, a change instruction of specifying a degree of modifying a value of a coefficient for calculation of the Op; and re-calculating a value of the Op, based on the change instruction that has been accepted from the user at the input unit.

5. A recording device configured to perform recording by ejecting, onto a recording medium, ink and a reaction solution including a flocculating agent that flocculates a substance contained in the ink, the recording device comprising:

a nozzle configured to eject the ink;

a nozzle configured to eject the reaction solution; and a control unit configured to control an ejection amount of the reaction solution, the control unit performing control so that $Op1 \geq Op2$ is satisfied, an ejection amount of the reaction solution in a first recording mode being Op1, an ejection amount of the reaction solution in a second recording mode being Op2, and a recording speed in the second recording mode being lower than in the first recording mode; and an input unit configured to accept, from a user, a change instruction of specifying a degree of modifying values of coefficients for calculation of the Op1 and the Op2, the control unit re-calculating a value of the Op1 and a value of the Op2, based on the change instruction that has been accepted from the user at the input unit.

* * * * *